United States Patent
Moon

(10) Patent No.: US 9,505,373 B2
(45) Date of Patent: Nov. 29, 2016

(54) CUSHION OF CURTAIN AIR BAG DEVICE

(71) Applicant: Hyundai Mobis Co., Ltd., Seoul (KR)

(72) Inventor: Geon Woong Moon, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/688,570

(22) Filed: Apr. 16, 2015

(65) Prior Publication Data

US 2015/0307057 A1    Oct. 29, 2015

(30) Foreign Application Priority Data

Apr. 23, 2014 (KR) ........................ 10-2014-0048838

(51) Int. Cl.
*B60R 21/2338* (2011.01)
*B60R 21/237* (2006.01)
*B60R 21/232* (2011.01)

(52) U.S. Cl.
CPC ......... *B60R 21/2338* (2013.01); *B60R 21/232* (2013.01); *B60R 21/237* (2013.01); *B60R 2021/23386* (2013.01)

(58) Field of Classification Search
CPC . B60R 20/232; B60R 20/233; B60R 20/237; B60R 2021/23308; B60R 2021/23324; B60R 2021/23386; B60R 21/2338; B60R 21/2334; B60R 2021/23316
See application file for complete search history.

(56) References Cited

U.S. PATENT DOCUMENTS

| | | |
|---|---|---|
| 4,290,627 A | 9/1981 | Cumming |
| 5,482,318 A | 1/1996 | Sollars |
| 6,481,743 B1 * | 11/2002 | Tobe ............... B60R 21/232 280/728.2 |
| 7,207,594 B2 | 4/2007 | Igawa et al. |
| 7,513,523 B2 | 4/2009 | Bayley et al. |
| 7,967,332 B2 | 6/2011 | Karlsson |
| 8,020,888 B2 | 9/2011 | Cheal et al. |
| 8,042,831 B2 | 10/2011 | Hoffman et al. |
| 8,186,708 B2 | 5/2012 | Zhou et al. |
| 8,414,021 B2 | 4/2013 | Tanaka et al. |
| 8,770,617 B2 * | 7/2014 | Abele ............ B60R 21/2338 280/730.1 |
| 8,770,618 B2 | 7/2014 | Fukawatase et al. |
| 9,108,588 B2 | 8/2015 | Fujawatase |
| 2003/0178831 A1 | 9/2003 | Roberts et al. |
| 2004/0007857 A1 | 1/2004 | Sonnenberg et al. |

(Continued)

FOREIGN PATENT DOCUMENTS

| | | |
|---|---|---|
| JP | 2003-146176 | 5/2003 |
| JP | 2012-96628 | 5/2012 |

(Continued)

OTHER PUBLICATIONS

Non-Final Office Action issued Feb. 10, 2016, in U.S. Appl. No. 14/695,423.

(Continued)

*Primary Examiner* — Barry Gooden, Jr.
(74) *Attorney, Agent, or Firm* — H.C. Park & Associates, PLC

(57) ABSTRACT

A cushion of a curtain air bag device may include: a cushion body part including: a main chamber receiving gas from an inflator and spreading to form a single gas layer, when a vehicle collides; and a reinforcement chamber forming a plurality of gas layers overlapping each other, and inflating more than the main chamber; and a tether part fastening the reinforcement chamber to maintain an overlapping state, when the cushion body part is expanded.

13 Claims, 5 Drawing Sheets

(56) References Cited

U.S. PATENT DOCUMENTS

| | | |
|---|---|---|
| 2004/0119270 A1 | 6/2004 | Gu et al. |
| 2004/0256841 A1 | 12/2004 | Bakhsh et al. |
| 2006/0131847 A1* | 6/2006 | Sato ............... B60R 21/207 280/730.2 |
| 2006/0249943 A1 | 11/2006 | Bauer et al. |
| 2007/0040361 A1 | 2/2007 | Bayley et al. |
| 2008/0012275 A1 | 1/2008 | Pinsenschaum et al. |
| 2008/0079246 A1* | 4/2008 | Dix ................. B60R 21/232 280/730.2 |
| 2008/0129023 A1* | 6/2008 | Heigl .............. B60R 21/232 280/730.1 |
| 2010/0032930 A1* | 2/2010 | Yamamura ...... B60R 21/232 280/730.2 |
| 2010/0219620 A1 | 9/2010 | Jaramillo |
| 2010/0253055 A1 | 10/2010 | Schneider et al. |
| 2011/0079990 A1* | 4/2011 | Cheal .............. B60R 21/213 280/730.2 |
| 2011/0260436 A1 | 10/2011 | Park et al. |
| 2012/0001409 A1 | 1/2012 | Azuma et al. |
| 2012/0235388 A1 | 9/2012 | Suzuki |
| 2012/0286500 A1 | 11/2012 | Wiik et al. |
| 2013/0001933 A1* | 1/2013 | Umehara ......... B60R 21/213 280/730.2 |
| 2013/0229002 A1 | 9/2013 | Enders |
| 2014/0042732 A1* | 2/2014 | Taguchi ........... B60R 21/233 280/729 |
| 2014/0091562 A1 | 4/2014 | Sugimoto |
| 2014/0217707 A1* | 8/2014 | Konishi ........... B60R 21/213 280/728.2 |
| 2014/0217710 A1* | 8/2014 | Fukawatase ..... B60R 21/233 280/730.2 |
| 2014/0239619 A1* | 8/2014 | Fukawatase ..... B60R 21/232 280/730.2 |
| 2014/0239620 A1* | 8/2014 | Kawamura ...... B60R 21/213 280/730.2 |
| 2014/0239621 A1 | 8/2014 | Kawamura et al. |
| 2014/0333053 A1* | 11/2014 | Thomas ........... B60R 21/2338 280/743.2 |
| 2015/0084316 A1* | 3/2015 | Okuhara .......... B60R 21/2338 280/729 |
| 2015/0145234 A1* | 5/2015 | Wang ............... B60R 21/232 280/729 |
| 2015/0307053 A1* | 10/2015 | Jo ..................... B60R 21/232 280/730.2 |

FOREIGN PATENT DOCUMENTS

| | | |
|---|---|---|
| JP | 2014-15104 | 1/2014 |
| JP | 2014-037159 | 2/2014 |
| JP | 2014-151734 | 8/2014 |
| JP | 2014-166796 | 9/2014 |
| JP | 2014-166798 | 9/2014 |
| KR | 10-2008-0008109 | 1/2008 |
| KR | 10-2012-0041505 | 5/2012 |

OTHER PUBLICATIONS

Non-Final Office Action issued Jan. 13, 2016, in U.S. Appl. No. 14/695,380.

Non-Final Office Action issued Jan. 15, 2016, in U.S. Appl. No. 14/694,574.

Non-Final Office Action issued on Jan. 13, 2016, in U.S. Appl. No. 14/695,380.

Non-Final Office Action issued on Jan. 15, 2016, in U.S. Appl. No. 14/694,574.

* cited by examiner

CUSHION OF CURTAIN AIR BAG DEVICE

CROSS-REFERENCES TO RELATED APPLICATIONS

This application claims priority from and the benefit of Korean Patent Application No. 10-2014-0048838, filed on Apr. 23, 2014, which is hereby incorporated by reference for all purposes as if fully set forth herein.

BACKGROUND

Field

Exemplary embodiments relate to a cushion of a curtain air bag device, and more particular, to a cushion of a curtain air bag device, which is installed in a vehicle so as to protect a passenger from an impact with a side of the vehicle during a vehicle collision.

Discussion

In general, an air bag is installed in the center of a steering wheel or in a crash pad at the front of a passenger seat, and protects the upper body and face of a driver or a passenger in the passenger seat during a collision accident. Furthermore, in order to maximize the protective effect, another air bag can be installed in a side of the vehicle (in part of the seat or a roof side rail, for example). A side air bag serves to protect the occupant from the impact of a lateral or oblique collision.

An air bag installed in the roof side rail can be referred to as a curtain air bag. A curtain air bag draws its name from the air bag cushion portion spreading downward from the roof to cover the window of a vehicle when the air bag is activated, like a curtain installed on a window of a home provides shade when drawn.

When an accident occurs, a control unit recognizes the collision through an impact sensor and activates an inflator to generate gas. Then, the generated gas is introduced into a cushion of the curtain air bag device. The cushion of the curtain air bag device is spread along the sides of the front and rear seats so as to protect occupants.

According to the above-described curtain air bag device, when the vehicle collides with another vehicle in an oblique direction, the occupant may be injured in the situation where the occupant's head is forced towards a space between the side curtain air bag and a front air bag, and misses bumping against the side curtain air bag or the front air bag. In that situation, occupants can be injured by an impact with a side of the vehicle or due to their heads being rapidly tilted to the side. Thus, there is a demand for a structure capable of solving such a problem.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a cushion of a curtain air bag device which is capable of reducing an injury of an occupant by increasing the chance of an occupant will bump against the cushion of the air bag.

Additional aspects will be set forth in the detailed description which follows, and, in part, will be apparent from the disclosure, or may be learned by practice of the inventive concept.

According to exemplary embodiments, a cushion of a curtain air bag device may include: a cushion body part including: a main chamber receiving gas from an inflator and spreading to form a single gas layer, when a vehicle collides; and a reinforcement chamber forming a plurality of gas layers overlapping each other, and inflating more than the main chamber; and a tether part fastening the reinforcement chamber to maintain an overlapping state, when the cushion body part is expanded or inflated.

The cushion body part may include: a sealing part sealing edges of the main chamber and the reinforcement chamber; and a fixing part formed on the sealing part so as to fix an edge of the tether part.

The cushion body part may further include a mounting part formed at the top of the sealing part and fixed to a vehicle body.

The fixing part may include: a first fixing part formed at the top of the sealing part at the rear side of the reinforcement chamber, and fastening the upper part of the reinforcement chamber with the mounting part; a second fixing part formed under the first fixing part; and a third fixing part formed on the sealing part at the front side of the reinforcement chamber, and fastening the lower part of the reinforcement chamber with the second fixing part.

The third fixing part may be formed at a level corresponding to a range of ½ to ¼ of the length of the reinforcement chamber.

The tether part may include: a first tether part covering one surface of the reinforcement chamber and having a first connection part formed thereon, the first connection part passing through the fixing part; and a second tether part covering the other surface of the reinforcement chamber and having a second connection part formed thereon, the second connection part being coupled to the first connection part passing through the fixing part.

The sealing part may have a gas introduction part formed at one side thereof, the gas introduction part forming a path through which gas supplied from the inflator is introduced into the main chamber and the reinforcement chamber via the sealing part.

The tether part may have a triangular shape.

The reinforcement chamber may include: a first chamber layer extended from the front side toward the rear side; a second chamber layer divided from the first chamber layer by a first inactive part which is not expanded, and extended toward the front side while overlapping the first chamber; and a third chamber layer divided from the second chamber layer by a second inactive part which is not expanded, and extended toward the rear side while overlapping the first and second chamber layers.

The main chamber may include: a front chamber layer communicating with the first chamber layer; and a rear chamber layer formed at the rear side of the front chamber layer, and communicating with the third chamber layer.

When the cushion body part is spread, the second chamber layer may maintain a state in which the second chamber layer is folded to the front side toward the first chamber layer.

The upper part of the tether part may fasten the first to third chamber layers together with the mounting part such that the upper parts of the first to third chamber layers maintain the contact therebetween.

The lower part of the tether part may fasten the first to third chamber layers such that the lower parts of the first to third chamber layers maintain the contact therebetween.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
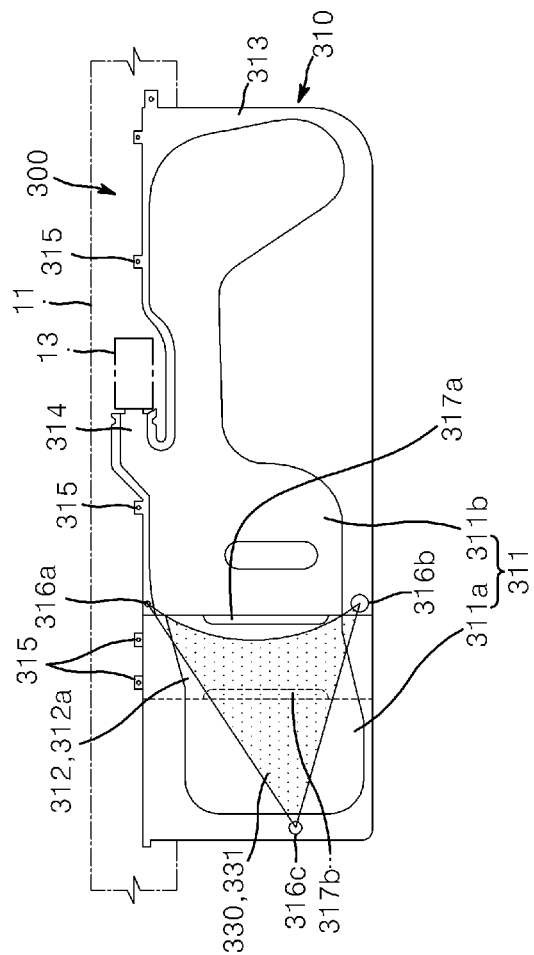
FIG. 1 is a side view schematically illustrating a cushion of a curtain air bag device in accordance with an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
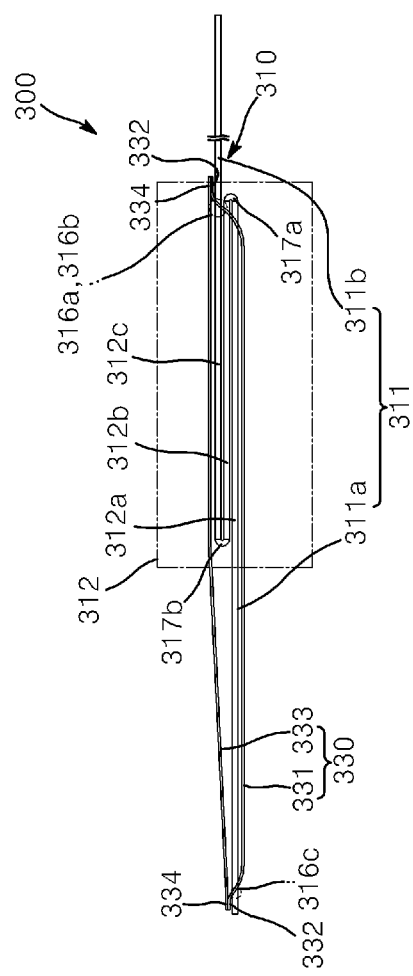
FIG. 2 is a top plan view schematically illustrating the cushion of the curtain air bag device prior to expansion in accordance with an exemplary embodiment.

FIG. 1 is a side view schematically illustrating a cushion of a curtain air bag device in accordance with an exemplary embodiment. FIG. 2 is a top plan view schematically illustrating the cushion of the curtain air bag device in accordance with an exemplary embodiment prior to expansion.

Referring to FIGS. 1 and 2, the cushion 300 of the curtain air bag device may include a cushion body part 310 and a tether part 330. In the following descriptions, suppose that the left side and the right side in FIGS. 1 and 2 are set to the front side and the rear side, respectively. The front side may indicate the same direction as the front side of the vehicle, and the rear side may indicate the same direction as the rear side of the vehicle.

When the vehicle collides or a collision is imminent, the cushion body part 310 may receive gas from an inflator 13 and expand to form a main chamber 311 and a reinforcement chamber 312.

The cushion body part 310 may include the main chamber 311, the reinforcement chamber 312, a sealing part 313, a gas introduction part 314, a mounting part 315, and a fixing part 316.

The main chamber 311 may receive gas from the inflator 13 and spread to form a gas layer extended from a front seat to a rear seat.

The main chamber 311 may include a front chamber layer 311a and a rear chamber layer 311b. The front chamber layer 311a may be formed so as to communicate with the front side of the reinforcement chamber 312, and the rear chamber layer 311b may be formed so as to communicate with the rear side of the reinforcement chamber 312.

Figure 3:
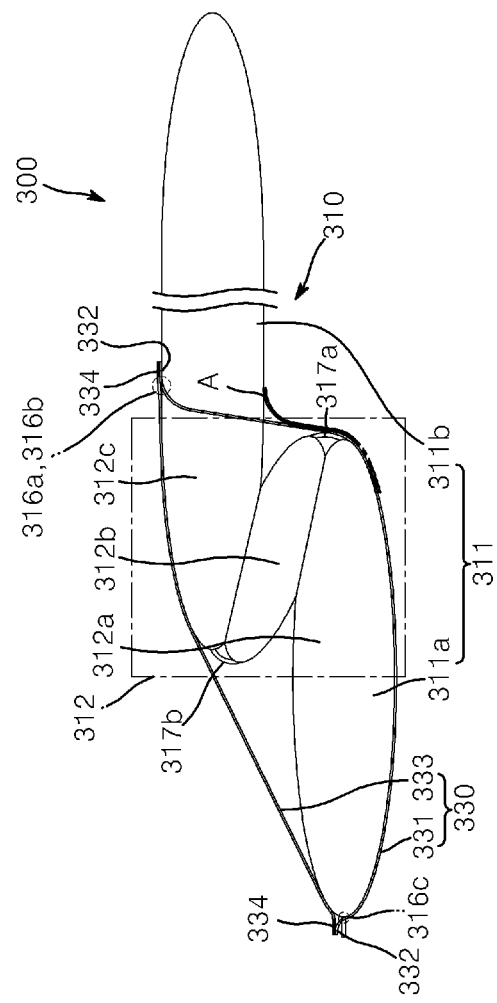
FIG. 3 is a top plan view schematically illustrating the cushion of the curtain air bag device after expansion in accordance with an exemplary embodiment.
Figure 4:
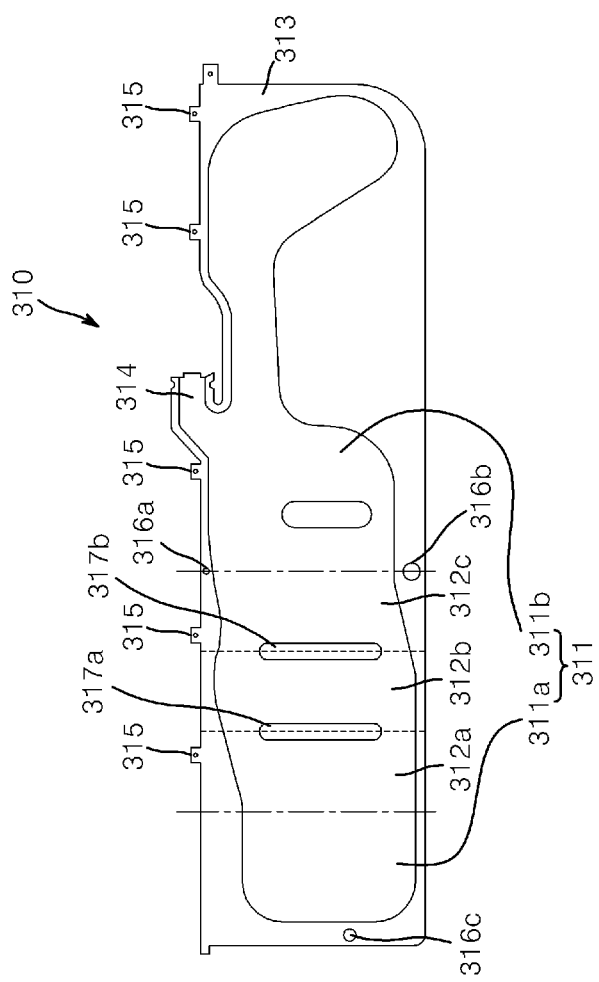
FIG. 4 is a side view schematically illustrating the cushion body part in accordance with an exemplary embodiment before the reinforcement chamber is folded.

FIG. 3 is a plan view schematically illustrating the cushion of the curtain air bag device in accordance with an exemplary embodiment in an expanded (inflated) state. FIG. 4 is a side view schematically illustrating the cushion body part before the reinforcement chamber is folded.

The reinforcement chamber 312 may be formed so as to communicate with the main chamber 311. When the cushion body part 310 is expanded, the reinforcement chamber 312 may be inflated more than the main chamber 311, while forming a plurality of gas layers overlapping each other, as illustrated in FIG. 3.

Referring to FIGS. 2 and 3, the reinforcement chamber 312 may have a multilayer structure in which a first chamber layer 312a, a second chamber layer 312b, and a third chamber layer 312c overlap each other.

The first chamber layer 312a may be formed so as to communicate with the front chamber layer 311a, and extended from the front side toward the rear side. At the boundary between the first and second chamber layers 312a and 312b, a first inactive part 317a may be formed as illustrated in FIG. 4. The first inactive part 317a may not be expanded even when gas is introduced. The first inactive part 317a may be formed by attaching or sewing one side surface and the other surface of the reinforcement chamber 312.

The second chamber layer 312b may be separated from the first chamber layer 312a by the first inactive part 317a, and folded toward the front side from the first inactive part 317a so as to overlap the first chamber layer 312a. At this time, the first inactive part 317a may be extended upward and downward. Thus, even when the cushion body part 310 is spread as illustrated in FIG. 3, the state in which the second chamber layer 312b is folded to the front side toward the first chamber layer 312a may be stably maintained.

At the boundary between the second chamber layer 312b and the third chamber layer 312c, a second inactive part 317b may also be formed as illustrated in FIG. 4. The second inactive part 317b may not be expanded even when gas is introduced. The third chamber layer 312c may be separated from the second chamber layer 312b by the second inactive part 317b. The third chamber layer 312c may be folded to the rear side from the second inactive part 317b so as to overlap the first and second chamber layers 312a and 312b, and communicate with the rear chamber layer 311b.

As described above, the cushion body part 310 may have a structure in which the front chamber layer 311a, the first chamber layer 312a, the second chamber layer 312b, the third chamber layer 312c, and the rear chamber layer 311b are successively connected to each other. Simultaneously, when the cushion body part 310 is spread, the reinforcement chamber 312 having a structure in which the first to third chamber layers 312a to 312c overlap each other may have a shape protruding from the rear chamber layer 311b.

The sealing part 313 may be formed at the edge of the cushion body part 310, and seal the edges of the main chamber 311 and the reinforcement chamber 312. The gas introduction part 314 may be formed at one side of the sealing part 313. The gas introduction part 314 may form a path through which the gas supplied from the inflator 13 is introduced into the main chamber 311 and the reinforcement chamber 312 via the sealing part 313.

The sealing part 313 may have a plurality of mounting parts 315 formed at the top thereof so as to fix the cushion body part 310 to the vehicle body 11. The plurality of mounting parts 315 may be consecutively arranged in the front-rear direction. As the plurality of mounting parts 315 are coupled to the vehicle body 11, the cushion 300 of the curtain air bag device may be installed to extend forward and backward on the vehicle body 11.

The fixing part 316 may serve to fix the edge of the tether part 330 to the cushion body part 310. The fixing part 316 may be formed through the sealing part 313.

The fixing part 316 may include a first fixing part 316a, a second fixing part 316b, and a third fixing part 316c.

The first fixing part 316a may be formed through the upper part of the sealing part 313 at the rear side of the reinforcement chamber 312. Among the three corners of the triangular-shaped tether part 330, one side positioned at the top may be coupled to the cushion body part 310 through the first fixing part 316a.

As described above, the mounting parts 315 formed at the positions corresponding to the first and third chamber layers 312a and 312c are fixed to the vehicle body 11, and the top of the tether part 330 may be additionally coupled to the first fixing part 316a. Thus, even when the cushion body part 310 is spread, the overlapping state may be stably maintained. That is, the upper part of the tether part 330 may fasten the first to third chamber layers 312a to 312c forming the reinforcement chamber 312, such that the upper parts of the first to third chamber layers 312a to 312c can maintain the contact therebetween.

The second fixing part 316b may be formed under the first fixing part 316a, and the third fixing part 316c may be formed on the sealing part 313 at the front side of the reinforcement chamber 312. Between the two corners positioned at the bottom of the triangular-shaped tether part 330, the corner positioned at the rear side may be coupled to the cushion body part 310 through the second fixing part 316b, and the other corner positioned at the front side may be coupled to the cushion body part 310 through the third fixing part 316c.

As the two corners positioned at the bottom of the tether part 330 are coupled through the second and third fixing parts 316b and 316c, the overlapping state may be stably maintained even when the cushion body part 310 is spread. That is, the lower part of the tether part 330 may fasten the first to third chamber layers 312a to 312c forming the reinforcement chamber 312, such that the bottoms of the first to third chamber layers 312a and 312c can maintain the contact therebetween.

At this time, the third fixing part 316c may be positioned at a level corresponding to a range of ½ to ¼ of the height of the reinforcement chamber 312. For example, when the reinforcement chamber 312 has a height of 40 cm, the third fixing part 316c may be formed at a level corresponding to a range of 10 to 20 cm from the bottom of the reinforcement chamber 312.

In an exemplary embodiment, the third fixing part 316c may be formed at a level corresponding to ⅓ of the height of the reinforcement chamber 312. For example, when the reinforcement chamber 312 has a height of 30 cm, the third fixing part 316c may be formed at a level corresponding to 10 cm from the bottom of the reinforcement chamber 312.

When the third fixing part 316c is positioned at a higher level than ½ of the height of the reinforcement chamber 312, the reinforcement chamber 312 may be inflated downward and escape to the outside of the tether part 330 through the space between the two corners positioned at the bottom of the tether part 330, in case where the reinforcement chamber 312 is spread.

Furthermore, when the third fixing part 316c is positioned at a lower level than ¼ of the height of the reinforcement chamber 312, the reinforcement chamber 312 may be inflated upward and escape to the outside of the tether part 330 through the space between the corner positioned at the top of the tether part 330 and the corner positioned at the front of the tether part 330, in case where the reinforcement chamber 312 is spread.

As described above, the third fixing part 316c may be positioned at a level corresponding to the range of ½ to ¼ of the height of the reinforcement chamber 312, and the corners of the tether part 330 may be coupled to the first to third fixing parts 316a to 316c, respectively. It is then possible to prevent the reinforcement chamber 312 from escaping to the outside, while the reinforcement chamber 312 is inflated when the cushion body part 310 is spread.

The tether part 330 may have a substantially triangular shape. When the cushion body part 310 is spread, the tether part 330 may fasten the reinforcement chamber 312 to maintain the overlapping state. The tether part 330 may be formed of a flexible fabric material.

The tether part 330 may include first and second tether parts 331 and 333 having a substantially triangular shape. The first tether part 331 may cover one surface of the reinforcement chamber 312, and the second tether part 333 may cover the other surface of the reinforcement chamber 312.

Figure 5:
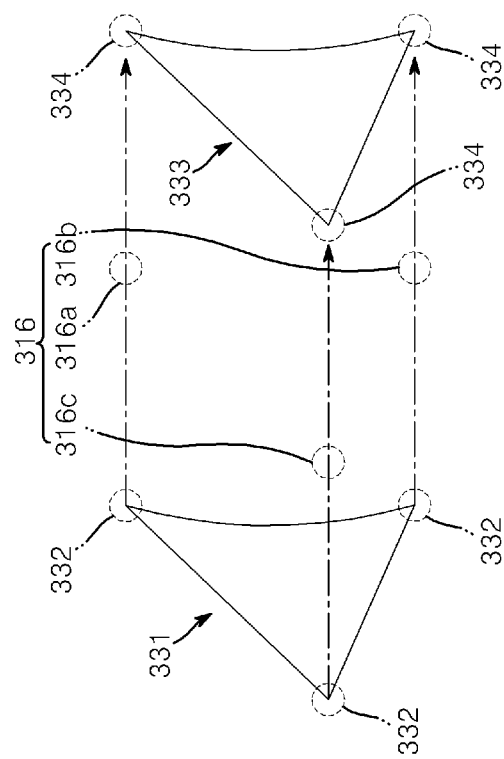
FIG. 5 is a conceptual view for describing a process of coupling the tether part to the cushion body part in accordance with an exemplary embodiment.

FIG. 5 is a conceptual view for describing a process of coupling the tether part to the cushion body part.

First, the first tether part 331 may be positioned at one surface of the reinforcement chamber 312. Then, as illustrated in FIG. 5, first connection parts 332 formed at the three corners of the first tether part 331 may be inserted into the first to third fixing parts 316a to 316c so as to pass through the reinforcement chamber 312 toward the other surface of the reinforcement chamber 312. Then, second connection parts 334 formed at the three corners of the second tether part 333 positioned at the other side of the reinforcement chamber 312 may be connected to the first connection parts 332, respectively. The first connection parts 332 and the second connection parts 334 may be connected through a connection process such as a sewing process.

As described above, the tether part 330 may be simply coupled to the cushion body part 310 through the fixing part 316 so as to reliably fasten both sides of the reinforcement chamber 312.

In the cushion 300 of the curtain air bag device, the reinforcement chamber 312 may be inflated in the lateral direction while forming a plurality of gas layers, when the vehicle collides. That is, a part of the cushion 300 of the curtain air bag device may protrude toward the front air bag.

Thus, it is possible to further reduce the space formed between the cushion 300 of the curtain air bag device and the driver or passenger air bag when the vehicle collides, or to block a path extended from an occupant's head toward the space. Therefore, it is possible to reduce a chance of injury to the occupant in the situation where the occupant's head is forced into the space between the cushion 300 of the curtain air bag device and the driver or passenger air bag.

Furthermore, when the vehicle collides, the main chamber 311 extended in the front-rear direction and the reinforcement chamber 312 inflated in the lateral direction may form a three-dimensional contact surface connected from the side to the front as indicated by A in FIG. 3.

Thus, when the vehicle collides, the side and top surfaces of the occupant's head may simultaneously come in contact with the cushion 300 of the curtain air bag device in a plurality of directions. Therefore, a part of the occupant's head may be supported by the cushion 300 of the curtain air bag device, which makes it possible to reduce an injury of the occupant, which may occur if the occupant's head is rapidly tilted to the side.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A cushion of a curtain air bag device, comprising:
  a cushion body part, configured to receive gas from an inflator in response to a collision-related detection, comprising:
    a main chamber configured to form a gas layer when inflated; and
    a reinforcement chamber disposed adjacent the main chamber, the reinforcement chamber configured to form overlapping gas layers and to protrude further toward a vehicle occupant than the main chamber when inflated; and
  a tether part fastening the reinforcement chamber, the tether part configured to maintain an overlapping state of the reinforcement chamber when the cushion body part is being inflated,
  wherein the reinforcement chamber is configured to form the overlapping gas layers by a front vertical fold in the cushion body part and a rear vertical fold in the cushion body part.

2. The cushion of claim 1, wherein the tether part has a substantially triangular shape.

3. The cushion of claim 1, wherein the reinforcement chamber comprises:
  a first chamber layer;
  a first inactive part configured to not substantially expand when the cushion body part is being inflated,
  a second chamber layer divided from the first chamber layer by the first inactive part, the second chamber layer extended from the first inactive part toward a front and overlapping the first chamber;
  a second inactive part configured to not substantially expand when the cushion body part is being inflated; and
  a third chamber layer divided from the second chamber layer by the second inactive part, the third chamber layer extending toward a rear from the second inactive part and overlapping the first and second chamber layers.

4. The cushion of claim 3, wherein the main chamber comprises:
  a front chamber layer adjacent the first chamber layer toward the front; and
  a rear chamber layer adjacent to the third chamber layer toward the rear.

5. The cushion of claim 3, wherein when the cushion body part is expanded, the second chamber layer maintains a state of being extended from the first inactive part toward the front and overlapping the first chamber.

6. The cushion of claim 3, wherein an upper part of the tether part is configured to fasten the first, second, and third chamber layers together with a mounting part such that upper parts of the first, second, and third chamber layers maintain contact therebetween.

7. The cushion of claim 3, wherein a lower part of the tether part is configured to fasten the first, second, and third chamber layers such that lower parts of the first, second, and third chamber layers maintain contact therebetween.

8. The cushion of claim 1, wherein the cushion body part comprises:
 a sealing part configured to seal edges of the main chamber and the reinforcement chamber; and
 a fixing part formed on the sealing part and configured to fix an edge of the tether part.

9. The cushion of claim 8, wherein the tether part comprises:
 a first tether part covering one surface of the reinforcement chamber and having a first connection part formed thereon, the first connection part passing through the fixing part; and
 a second tether part covering an other surface of the reinforcement chamber and having a second connection part formed thereon, the second connection part being coupled to the first connection part passing through the fixing part.

10. The cushion of claim 8, wherein the sealing part comprises a gas introduction part formed at one side thereof, the gas introduction part configured to form a path through which the gas supplied from the inflator is introduced into the main chamber and the reinforcement chamber via the sealing part.

11. The cushion of claim 8, wherein the cushion body part further comprises a mounting part formed at a top of the sealing part and configured to fix the top of the sealing part to a vehicle body.

12. The cushion of claim 11, wherein the fixing part comprises:
 a first fixing part formed at the top of the sealing part at a rear side of the reinforcement chamber and configured to fasten an upper part of the reinforcement chamber with the mounting part;
 a second fixing part formed under the first fixing part; and
 a third fixing part formed on the sealing part at a front side of the main chamber and configured to fasten a lower part of the reinforcement chamber in cooperation with the second fixing part.

13. The cushion of claim 12, wherein the third fixing part is formed at a level corresponding to a range of ½ to ¼ of a vertical height of the reinforcement chamber.

* * * * *